United States Patent [19]

Torborg et al.

[11] Patent Number: 5,501,021
[45] Date of Patent: Mar. 26, 1996

[54] COMMON IDLER STRAP FOR USE IN A CLOTHES DRYER

[75] Inventors: Kevin Torborg, Webster City; Max Fischbach, Fort Dodge, both of Iowa

[73] Assignee: White Consolidated Industries, Inc., Cleveland, Ohio

[21] Appl. No.: 453,231

[22] Filed: May 30, 1995

[51] Int. Cl.⁶ .................................................. F26B 17/00
[52] U.S. Cl. ............................................... 34/594; 34/601
[58] Field of Search .............................. 34/594, 601, 602, 34/603, 604

[56] References Cited

U.S. PATENT DOCUMENTS

| | | | |
|---|---|---|---|
| 2,809,442 | 10/1957 | Glasby, Jr. .............................. | 34/601 |
| 3,155,462 | 11/1964 | Erickson et al. ........................ | 34/602 |
| 3,330,049 | 7/1967 | Helton . | |
| 3,509,640 | 5/1970 | Bullock et al. . | |
| 3,513,566 | 5/1970 | Shacklock et al. ...................... | 34/601 |
| 3,546,786 | 12/1970 | Jacobs . | |
| 3,987,683 | 10/1976 | Singh . | |
| 4,253,343 | 3/1981 | Black et al. . | |
| 4,300,293 | 11/1981 | Gladysz . | |
| 4,407,077 | 10/1983 | Smith . | |
| 4,488,363 | 12/1984 | Jackson et al. . | |
| 4,653,200 | 3/1987 | Werner .................................... | 34/604 |
| 4,872,768 | 10/1989 | Brandenstein et al. . | |
| 4,934,988 | 6/1990 | Kawamura et al. . | |

*Primary Examiner*—John T. Kwon
*Attorney, Agent, or Firm*—Pearne, Gordon, McCoy & Granger

[57] ABSTRACT

An idler device is provided for maintaining tension on a belt driven by a rotating drive pulley of a motor. The idler device includes an idler strap assembly having a strap with first and second end portions, a circular boss on the first end portion, and an idler pulley rotatingly mounted on the second end portion. The boss extends through an opening in a wall of a motor support bracket which is generally perpendicular to a rotational axis of the drive pulley such that the strap is rotatable about a central axis of the boss which is parallel to a rotational axis of the drive pulley. The boss has a pair of opposed, longitudinally extending, rectangular tabs behind the wall to secure the strap to the wall. The idler pulley has a rotational axis generally parallel with the rotational axis of the drive pulley. The spring element is connected between the support bracket and the strap such that rotation of the strap is biased in a direction toward the drive pulley with the idler pulley against the belt to tension the belt. The opening in the wall has a pair of opposed rectangular notches at a 45 degree angle relative to vertical in a direction opposite the biased rotation of the strap for passage of the tabs to install and remove the strap.

20 Claims, 3 Drawing Sheets

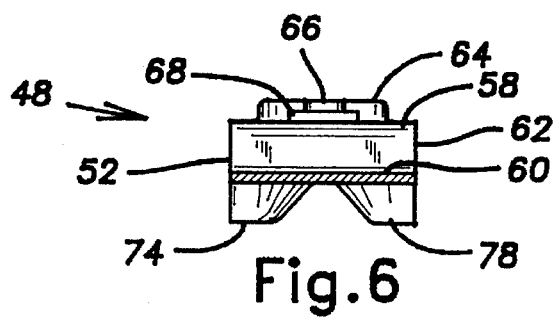
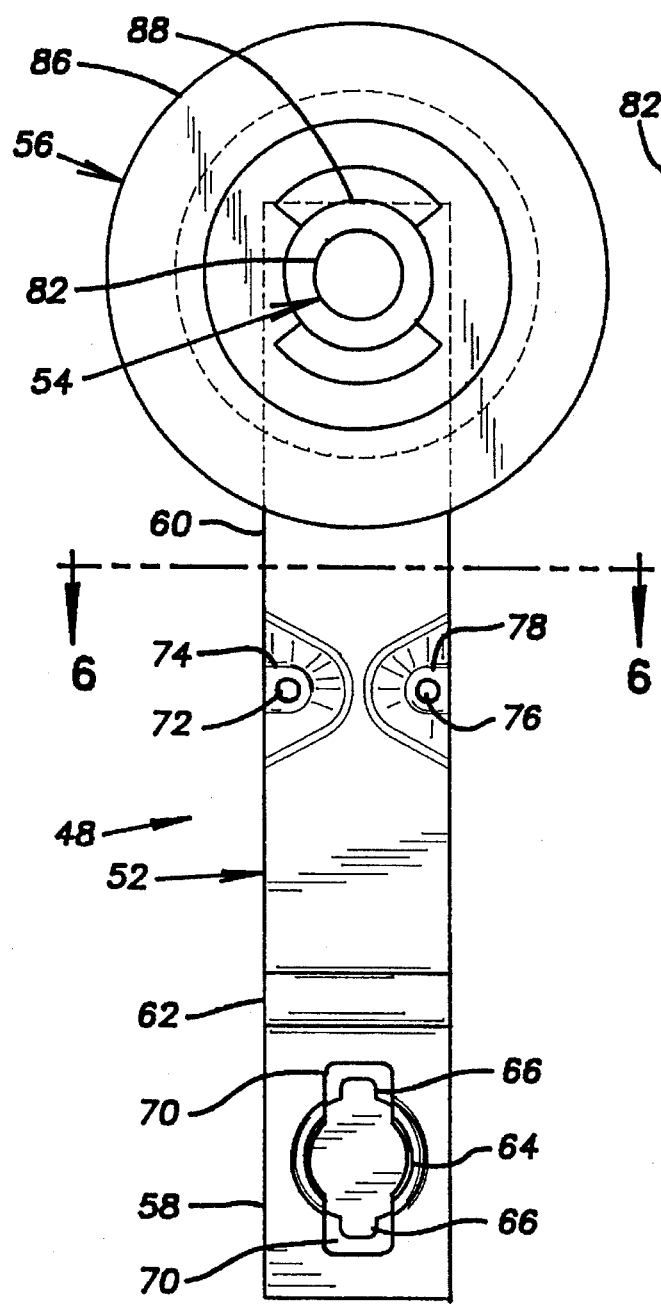
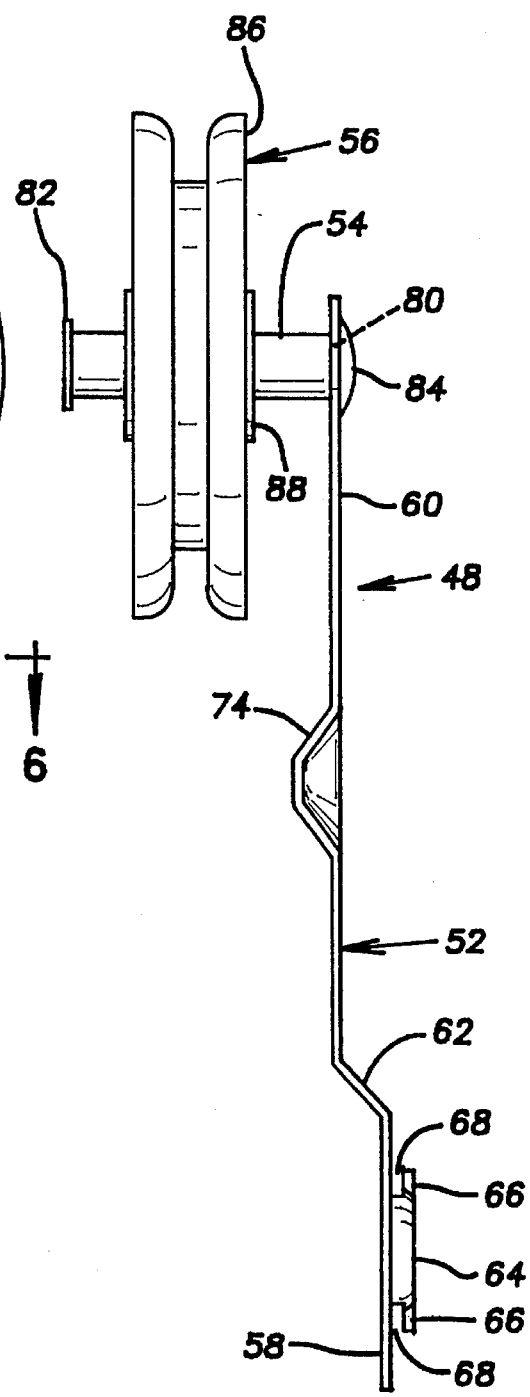

COMMON IDLER STRAP FOR USE IN A CLOTHES DRYER

BACKGROUND OF THE INVENTION

1. Field of the Invention

The present invention generally relates to clothes dryers and, more particularly to an idler device for a drive belt of a clothes dryer.

2. Description of the Related Art

An idler device or belt tensioning assembly is employed in a clothes dryer to provide tension to a continuous or endless drive belt which extends around a drive pulley and a rotatable dryer drum. The idler assembly provides sufficient tension to the belt so that various loads tumbled in the drum do not produce belt slippage. It is important that belt slippage be avoided because it results in a high rate of belt wear or failure. The idler assembly typically has a resilient element to compensate for stretching of the belt over extended use.

Previous idler devices have included one or more idler pulleys mounted on various support members by various spacers and mechanical fasteners. For example, see U.S. Pat. Nos. 4,300,293, 4,407,077, and 4,488,363 the disclosures of which are expressly incorporated herein in there entirety by reference. It will be appreciated that the more complex the construction of the idler device becomes the more expensive the cost of manufacture for a clothes dryer becomes. It will also be appreciated that both reducing the number of components in a particular idler device and having common components in clothes dryers having differently configured idler devices, results in realizable cost savings. Accordingly, there is a need in the art for an improved idler device having a simple construction, a reduced number of components, and common components for a variety of clothes dryer configurations.

SUMMARY OF THE INVENTION

The present invention provides an idler device for maintaining tension on a belt driven by a rotating drive pulley of a motor that overcomes limitations of the related art. The idler device includes a support bracket, an idler strap assembly, and a spring element. The support bracket has a wall generally perpendicular to a rotational axis of the drive pulley and an opening in the wall. The idler strap assembly includes a strap having first and second end portions, a boss on the first end portion, and an idler pulley rotatingly mounted on the second end portion. The boss extends through the opening in the wall whereby the strap is rotatable about a central axis of the boss. The idler pulley has a rotational axis generally parallel with the rotational axis of the drive pulley. The spring element is connected to the strap such that rotation of the strap is biased in a direction toward the drive pulley with the idler pulley against the belt to tension the belt.

BRIEF DESCRIPTION OF THE DRAWINGS

The present invention will hereafter be described with reference to the drawing figures, wherein:

FIG. 4 is an elevational front view of the idler strap assembly of FIG. 2;

FIG. 5 is an elevational side view of the idler strap assembly of FIG. 4;

FIG. 6 is a cross-sectional view of the idler strap assembly taken along line 6—6 of FIG. 4.

DETAILED DESCRIPTION OF THE PREFERRED EMBODIMENT

Figure 1:
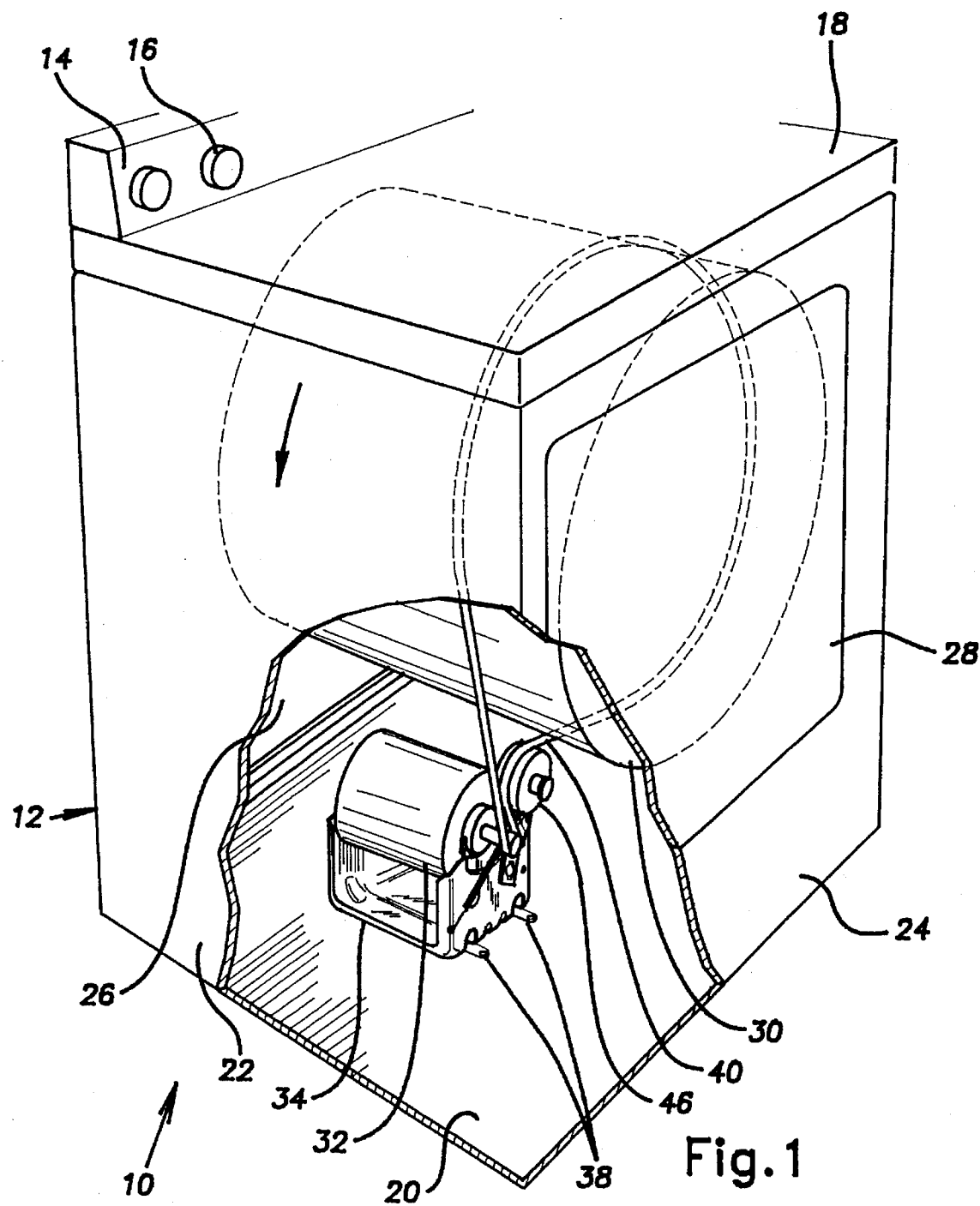
FIG. 1 Is a perspective view of a clothes dryer employing an idler device according to the invention.
Figure 2:
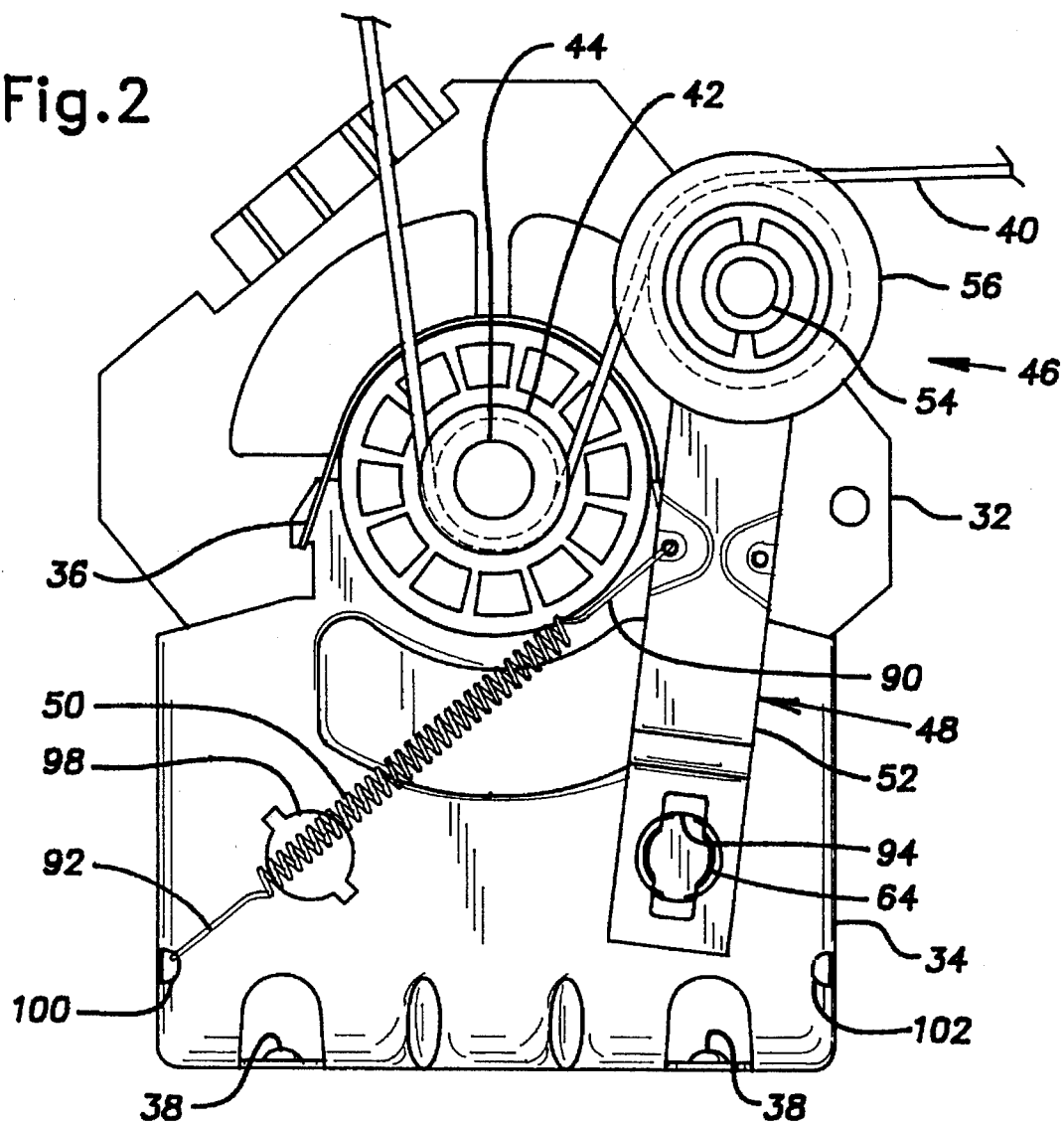
FIG. 2 is an elevational front view of an idler device according to the invention.

Referring to FIGS. 1 and 2, a laundry machine or clothes dryer 10 according to the invention is illustrated absent most of the elements not directly pertinent to the present invention. The clothes dryer 10 includes an enclosure cabinet or housing 12 with a control console 14 thereon having control knobs 16 for regulating the drying operation. The housing 12 includes a horizontal top panel 18, a horizontal bottom panel or base 20, a pair of vertical side panels 22 (only one shown), a vertical front panel 24, and a vertical rear panel 26. An access opening, having a closure door 28, is provided in the front panel for loading and unloading the clothes dryer 10.

The clothes dryer 10 also includes a fabric treatment or drying container for tumbling clothes, in the form of a rotatable drum 30 housed within the housing 12 and extending axially between the front and rear panels 24, 26. The drum 30 is rotatably supported at the rear of the drum 30 and has an access opening at the front of the drum 30 which is substantially adjacent the access opening in the front panel 24 of the housing 12 to provide access into the drum 30 from outside the housing 12.

A drive motor 32 is attached to the base 20 of the housing 12 near a corner of the housing 12 and rotatably drives the drum 30 by means of a transmission. The drive motor 32 is secured to a motor support bracket or cradle 34 by a pair of retaining straps 36. The motor cradle 34 is secured to the base 20 of the housing 12 by suitable attachment means 38 such as, for example, bolts.

The transmission member is a continuous or endless, flat, drive belt 40 which extends around the periphery of, in frictional engagement with, the drum 30. The drive belt 40 also extends around a motor drive pulley 42 which is mounted on one end of a motor drive shaft 44. An idler system or device 46 is provided to tension the drive belt 40 so that the drive motor 32 rotatably drives the drum 30.

The idler device 46 includes an idler strap assembly 48 and a spring member 50. As best seen in FIGS. 4–6, the idler strap assembly 48 includes an idler bracket or strap 52, a shaft or stud 54, and an idler pulley or wheel 56. The strap 52 is preferably formed from a generally elongate strip of suitable material such as, for example, steel. The strap 52 has first and second end portions 58, 60 connected by a central portion 62. As best seen in FIG. 5, the central portion 62 is at an angle of about 45 degrees relative to the first and second end portions 58, 60 such that the first and second end portions 58, 60 are generally parallel and offset. The central portion 62 is configured to offset the first and second end portions 58, 60 to adequately space the second end portion 60 from the front panel or wall of the motor cradle 34 and eliminate the need for a separate spacer.

Located on the first end portion 58 of the strap is a raised boss 64 for attaching the strap 52 to a front panel of the motor cradle 34 (FIG. 2) which is generally perpendicular to the axis of the drive shaft 44 (FIG. 2). The attachment boss 64 is generally circular with two opposed generally rectangular tabs 66 and outwardly extends from the back side of the first end portion 58, that is, from the side opposite the side the connecting portion 62 outwardly extends from. The tabs 66 radially extend along the longitudinal axis of the strap 52 and are located at the top of the boss 64 to form a space or gap 68 between the tabs 66 and the first end portion 58 of the strap 52. The gap 68 is sized to receive the thickness of the front panel of the motor cradle 34. The attachment boss 64 is formed by punching a pair of horseshoe-shaped holes or openings 70 which form the tabs 66. The boss 64 is then pressed through the strap 52 to raise the tabs 66 and form the gap 68.

A circular hole or opening 72 is located generally at the center of the strap 52, on the second end portion 60, and near an edge of the strap 52 that will be adjacent the drive pulley 42 (FIG. 2). The opening 72 is preferably located on the top of a boss 74 that outwardly extends from the front side of the strap 52, that is, from the side opposite the attachment boss 64. The opening 72 is sized for receiving an end of the spring member 50 (FIG. 2). The boss 72 is sized for providing clearance to attaching the spring member 50 (FIG. 2). Preferably, a second opening and boss 76, 78 is provided on the opposite edge of the strap 52 so that the spring member 50 (FIG. 2) can be alternatively attached to either side of the strap 52. Located generally at the top end of the strap 52, on the second end portion 60, is a circular hole or opening 80 sized for receiving the stud 54.

The stud 54 is generally cylindrically shaped and has a flange 82 at one end for retaining the wheel 56 on the stud 54. The other end of the stud 54 has a reduced diameter portion 84 sized to extend through the opening 80 in the second end portion 60 of the strap 52. The end of the reduced diameter portion 84 is swaged to fix the stud 54 to the strap 52. It is noted that the stud 54 can be attached to the strap 52 by other suitable attachment means such as, for example, welding or mechanical fasteners.

The wheel 56 is of a standard configuration for receiving a flat drive belt 40 (FIG. 2). Preferably the wheel 56 includes a molded plastic outer portion 86 and a central powder metal bearing or bushing 88. The outer portion is sized for receiving the drive belt (FIG. 2). The bushing 88 is sized for receiving the stud 54 such that the wheel 56 rotates about the stud 54. The wheel 56 floats on the stud 54 between the flange 82 and the strap 52 so that it can naturally align with the drive belt 40 (FIG. 2).

The spring member 50 is a common tension spring having hooked ends 90, 92. The spring member 50 is sized to bias the idler strap assembly 48 against the drive belt 40 adjacent the drive pulley 42 such that the drive belt 40 is tensioned around about one half the periphery of the drive pulley 42, as best shown in FIG. 2.

Figure 3:
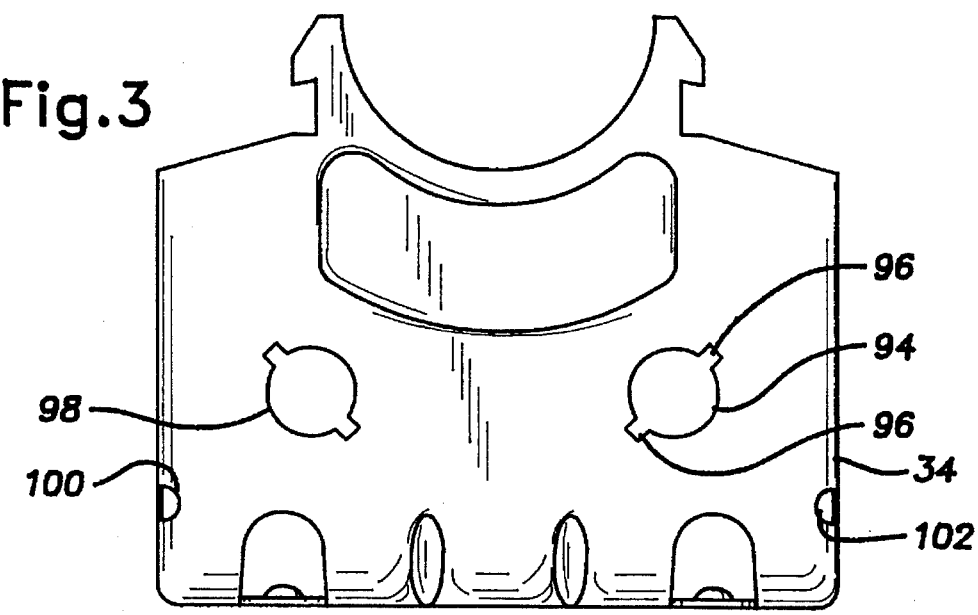
FIG. 3 is an elevational front view of the motor cradle of FIG. 2.

As best shown in FIG. 3, the front panel or wall of the motor cradle 34 has a generally circular hole or opening 94 with opposed rectangularly-shaped notches 96. The notches 96 are at an angle of about 45 degrees relative to vertical in a direction away from the direction the strap 52 is biased by the spring member 50. The notched opening 94 is sized for receiving the attachment boss 64 and rotatably attaching or locking the strap 52 to the motor cradle 34 when the tabs 66 are not aligned with the notches 96. A second notched hole 98 is located on the front panel of the motor cradle 34 on the opposite lateral side such that the idler strap assembly 48 can be alternatively attached on either side of the drive pulley 42 (FIG. 2). Both of the notched openings 94, 98 are located on the front panel of the motor cradle 34 such that the wheel 56 of the idler strap assembly 46 engages the drive belt 40 near the drive pulley 42 when the idler strap assembly 46 is in a generally vertical position, as best shown in FIG. 2.

The front panel of the motor cradle 32 also has a circular hole or opening 100 sized for receiving an end 92 of the spring member 50. The spring member opening 100 is located on the opposite lateral side of motor cradle 34 from the notched opening 94 and generally at the edge of the front panel of the motor cradle 34. A second spring member opening 102 is located on the opposite lateral edge of the motor cradle 34 to cooperate with a idler strap assembly 48 attached to the second notched opening 98 of the motor cradle 34.

The idler strap assembly 48 is secured to the motor cradle 34 by inserting the attachment boss 64 through the notched opening 94 with the tabs 66 aligned with the notches 96. The idler strap assembly 48 is then rotated or turned about the central axis of the attachment boss 64 to a generally vertical position as shown in FIG. 2. Once the idler strap assembly 48 has been rotated, the front panel of motor cradle 34 extends into the gap 68 between the tabs 66 and the first end portion 58 of the strap 52 such that the tabs 66 are on the back side of and engage the front panel of the motor cradle 34 to retain the idler strap assembly 48 to the motor cradle 34. With the idler strap assembly 48 attached in this manner, the idler strap assembly 48 is free to rotate about the central axis of the attachment boss 64 and the notched opening 94.

When the idler strap assembly 48 is attached and in the generally vertical position shown in FIG. 2, the wheel 56 is located beside and above the drive pulley 42. The spring member 50 is attached by inserting the one hooked end 90 through the opening 72 on the strap 52 and the other hooked end through the opening 100 on the motor cradle 34 such that the idler strap assembly 48 is biased toward the drive pulley 42. The idler strap assembly 48 rotates about the central axis of the attachment boss 64 in a counter-clockwise direction (as viewed in FIG. 2) as it is biased toward the drive pulley 42. The drive belt 40 is inserted around the drive pulley 42 and between the drive pulley 42 and the wheel 56 such that the idler device 46 tensions the drive belt 40.

It is noted that idler device 46 could alternatively be attached in a second or opposite configuration where the idler strap assembly 48 is attached to the second notched hole 98 and the spring member 50 is attached to the second spring opening 76 of the strap 52 and the second spring opening 102 of the front panel of the motor cradle 34. This alternate configuration would be used, for example, when the drive motor 32 is mounted on the opposite side of the drum 30. By having an idler device 46 which can be attached on either side of the motor drive pulley 42, a common idler strap assembly 48 and motor cradle 34 can be used for clothes dryers 10 having different configurations, that is, having drive motors 32 mounted in different locations relative to the drums 30.

In operation of the clothes dryer 10, the idler device 46 takes up any slack in the drive belt 40. The tension provided by the idler device 46 is determined by the sizing of the spring member 50. The resiliency of the spring member 50 compensates for changes in bias load from the drive belt 40 acting on the wheel 56. As the drive belt 40 slackens, the resiliency of the spring member 50 allows the wheel to move along an arc back towards the drive pulley 42. The wheel 56 also is slidable along the stud 54 such that the wheel 56 will substantially align itself with the drive pulley 42. It should be understood that in taking up the slack in the drive belt 40, the degree of wrap by the drive belt 40 around the drive pulley 42 increases the amount of surface area of the drive pulley 42 coming into contact with the drive belt 40.

It will therefore be seen that the idler device 46 has a simple construction, eliminates spacers and mechanical fasteners previously required to attach idler pulley supports, and can secured to either side of the drive pulley so that common parts can be used for a variety of clothes dryer configurations such as, for example, forwardly or rearwardly facing motors or motors mounted on either side of the drum. Although a particular embodiment of the present invention has been described in detail, it will be understood that the invention is not limited correspondingly in scope, but includes all changes and modifications coming within the spirit and terms of the claims appended hereto.

What is claimed is

1. An idler device for maintaining tension on a belt driven by a rotating drive pulley of a motor, said idler device comprising:

a support bracket having a wall generally perpendicular to a rotational axis of said drive pulley and an opening in said wall;

an idler strap assembly including a strap having first and second end portions and a boss on said first end portion, said boss extending through said opening in said wall whereby said strap is rotatable about a central axis of said boss, and an idler pulley rotatingly mounted on said second end portion of said strap, said idler pulley having a rotational axis generally parallel with the rotational axis of the drive pulley; and a spring element connected to said strap and biasing rotation of said strap in a direction toward the drive pulley with said idler pulley against the belt to tension the belt.

2. The idler device according to claim 1, wherein said boss has at least two tabs extending behind said wall to secure said strap to said support wall.

3. The idler device according to claim 2, wherein said tabs are equally spaced about a periphery of said attachment boss.

4. The idler device according to claim 2, wherein said boss has two opposed longitudinally extending tabs.

5. The idler device according to claim 2, wherein said tabs are generally rectangularly-shaped.

6. The idler device according to claim 1, wherein said boss is generally circularly-shaped.

7. The idler device according to claim 2, wherein said opening has notches adapted for passage of said tabs to install and remove said strap.

8. The idler device according to claim 7, wherein said notches are at an angle relative to a vertical axis.

9. The idler device according to claim 8, wherein said angle is about 45 degrees.

10. The idler device according to claim 7, wherein said opening has two opposed notches at an angle relative to vertical in a direction opposite the biased rotation of said strap.

11. The idler device according to claim 1, wherein said opening is located laterally of the drive pulley and a second opening in said wall is located laterally of the drive pulley in an opposite direction whereby said boss selectively extends through said opening and said second opening.

12. The idler device according to claim 1, wherein said boss extends from a back surface of said strap and a second boss extends from a front surface of said strap generally at a first side of said strap, said second boss having an opening for connecting said spring element to said strap.

13. The idler device according to claim 12, wherein said strap has a third boss extending from said front surface of said strap generally at a second side of said strap, said third boss having an opening for connecting said spring element, whereby said spring element is selectively connected to said second boss and said third boss.

14. The idler strap according to claim 1, wherein said strap has a connecting portion spacing said first and second end portions whereby said first and second end portions are parallelly offset.

15. An idler strap assembly comprising:

a strap having first and second end portions;

a boss on said first end portion having two opposed, longitudinally extending, tabs located generally at a top of said boss; and an idler pulley rotatingly mounted on said second end portion.

16. The idler strap assembly according to claim 15, wherein said boss extends from a back surface of said strap and a second boss extends from a front surface of said strap generally adjacent a first side of said strap, said second boss having an opening at a top of said second boss.

17. The idler strap assembly according to claim 16, wherein said strap has a third boss extending from said front surface of said strap generally adjacent a second side of said strap, said third boss having an opening a top of said third boss.

18. The idler strap according to claim 15, wherein said strap has a connecting portion spacing said first and second end portions whereby said first and second end portions are parallelly offset.

19. A clothes dryer having a rotating drum for receiving clothes to be dried, said clothes dryer comprising:

a motor for driving the drum having a drive pulley on a rotating shaft;

a bracket supporting said motor having a wall generally perpendicular to a rotational axis of said shaft and an opening in said wall;

a continuous belt drivingly connecting said drive pulley to said drum;

an idler strap assembly including a strap having first and second end portions and a boss on said first end portion, said boss extending through said opening in said wall whereby said strap is rotatable about a central axis of said boss, and an idler pulley rotatingly mounted on said second end portion of said strap, said idler pulley having a rotational axis generally parallel with the rotational axis of the drive pulley; and a spring element connected between said support bracket and said strap, said spring element biasing rotation of said strap in a direction toward said drive pulley with said idler pulley against said belt to tension said belt.

20. The clothes dryer according to claim 19, wherein said boss has at least two tabs extending behind said wall to secure said strap to said wall.

* * * * *